(12) United States Patent  
Villarreal et al.

(10) Patent No.: US 9,429,272 B1
(45) Date of Patent: *Aug. 30, 2016

(54) BASALT-BASED PRESSURE VESSEL FOR GAS STORAGE AND METHOD FOR ITS PRODUCTION

(71) Applicant: CleanNG, LLC, Tulsa, OK (US)

(72) Inventors: Robert Matthew Villarreal, Tulsa, OK (US); Aaron Laney, Tulsa, OK (US)

(73) Assignee: CLEANNG, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,906

(22) Filed: Jan. 12, 2015

Related U.S. Application Data

(63) Continuation of application No. 13/734,744, filed on Jan. 4, 2013, now Pat. No. 8,932,695.

(60) Provisional application No. 61/582,930, filed on Jan. 4, 2012.

(51) Int. Cl.
*F17C 1/06* (2006.01)

(52) U.S. Cl.
CPC .......... *F17C 1/06* (2013.01); *F17C 2201/0109* (2013.01); *F17C 2203/067* (2013.01); *F17C 2203/0624* (2013.01); *F17C 2203/0665* (2013.01); *F17C 2203/0675* (2013.01); *F17C 2209/2163* (2013.01); *F17C 2223/035* (2013.01)

(58) Field of Classification Search
CPC ........ B29D 22/00; B29D 23/00; B32B 1/08; F17C 1/06

See application file for complete search history.

(56) References Cited

U.S. PATENT DOCUMENTS

| | | |
|---|---|---|
| 7,867,589 B2 | 1/2011 | DeLay |
| 2006/0287186 A1 | 12/2006 | Kamiya et al. |

*Primary Examiner* — Michael C Miggins
(74) *Attorney, Agent, or Firm* — GableGotwals

(57) ABSTRACT

A pressure vessel includes a first (base or innermost) layer composed of a resin-impregnated woven sleeve with chopped basalt fibers assembled in the voids of the sleeve and impregnated with an epoxy resin. A second and third layer is composed of continuous basalt fiber filaments arranged in a helical pattern, with the helical angle of the second layer being not equal to that of the third layer. A fourth layer is composed of continuous basalt fibers arranged in a hoop pattern. The fifth (outermost) layer is composed of randomly oriented chopped basalt fibers impregnated with a resin matrix and compacted with the subsequent wound filaments at up to ten pounds of tension.

17 Claims, 4 Drawing Sheets

BASALT-BASED PRESSURE VESSEL FOR GAS STORAGE AND METHOD FOR ITS PRODUCTION

CROSS REFERENCE TO PENDING APPLICATIONS

This application claims priority to U.S. Prov. Pat. Appl. Ser. No. 61/582,930, filed Jan. 4, 2012.

BACKGROUND OF THE INVENTION

This invention relates generally to the field of composite materials and, more particularly, to gas-impermeable composite materials which include basalt and are intended for use in high pressure applications.

Pressure vessels are used in many industries to store gasses under high pressures. These pressure vessels are generally constructed out of carbon-based composites, namely, a high strength plastic reinforced with carbon fiber filaments. The carbon fiber filaments are costly to manufacture and must go through a variety of resource-intensive processes which, in turn, produce a variety of hazardous byproducts. The manufacturing process involves a filament winding process in which a fiber tow is first impregnated with a matrix resin and then applied at predetermined angles to a rotating liner or mandrel (which is typically made of aluminum or high-density polyethylene). After the impregnated fibers are applied, the structure must be cured, usually by heat.

By way of example, a composite pressure vessel used for high pressure cryogenic storage is disclosed in U.S. Pat. No. 7,867,589 to DeLay. The inner layer of the vessel is a matrix of fiber (e.g., aramid fiber) and polyurethane resin. The outer layer encapsulates the inner layer, provides structural support to that layer, and is a matrix of fiber (e.g., aramid or carbon fiber) and resin (e.g., high ductability resin or polyurethane matrix that performs well at low temperature). Once the inner and outer layers are cured, the mandrel is removed. Because this vessel is designed to contain a liquid stored at low temperatures, it does not require an impermeable barrier. Therefore, the vessel can make use of carbon (or aramid) fibers and foregoes a metal or polymeric liner. There is a need for a high pressure, liner-free vessel for storing compressed natural gas that does not rely upon carbon or aramid fibers, is more easily manufactured than those carbon- and aramid-fiber based vessels, does not involve the manufacturing step of collapsing the mandrel after the vessel material has been cured, and is lighter weight and smaller than metal pressure vessels of equivalent size and pressure ratings.

SUMMARY OF THE INVENTION

A pressure vessel made according to this invention includes a first (base or innermost) layer composed of a resin-impregnated woven sleeve with any material of any suitable size (e.g., nano-additives and/or chopped basalt fibers but preferably not a carbon or aramid fiber because of their permeability performance) assembled in the voids of the sleeve and impregnated with a resin matrix. A second and third layer is composed of continuous basalt fiber filaments arranged in a helical pattern, with the helical angle of the second layer being not equal to that of the third layer. The first, second and third layers combine to make a permeation barrier. A fourth layer is composed of continuous basalt fibers arranged in a hoop pattern. The fifth (outermost) layers are composed of randomly oriented chopped basalt fibers impregnated with epoxy resin and compacted with the subsequent wound filaments at, preferably, in a range of five to ten pounds pounds of tension, with ten pounds being most preferred. Subsequent wound filaments are at least one layer but can be up to one hundred plus layered patterns of carbon and aramid (e.g. KEVLAR® aramid) fiber on top of the basalt.

Objects of this invention are to provide a pressure vessel which: (1) avoids the use of carbon and aramid fiber filaments, and is carbon fiber (and aramid fiber) filament free in its impermeability layer or strata; (2) provides a reinforced plastic having superior strength, durability and gas barrier properties when compared to that used in current art pressure vessels; (3) can be used for pressure vessels in gas storage applications in a range of about 100 psi and up; (4) can provide a liner-less or liner-free pressure vessel (e.g. a type III or IV tank) for use in non-cryogenic storage applications above 100 psi; (5) can be used to store gases, liquids or powder; (5) is formed using water-soluble tooling; (6) can be non-spherical or non-cylindrical in shape; and (7) is easier to manufacture, more cost effective and more environmentally friendly than lined tanks.

DETAILED DESCRIPTION OF THE INVENTION

Figure 1:
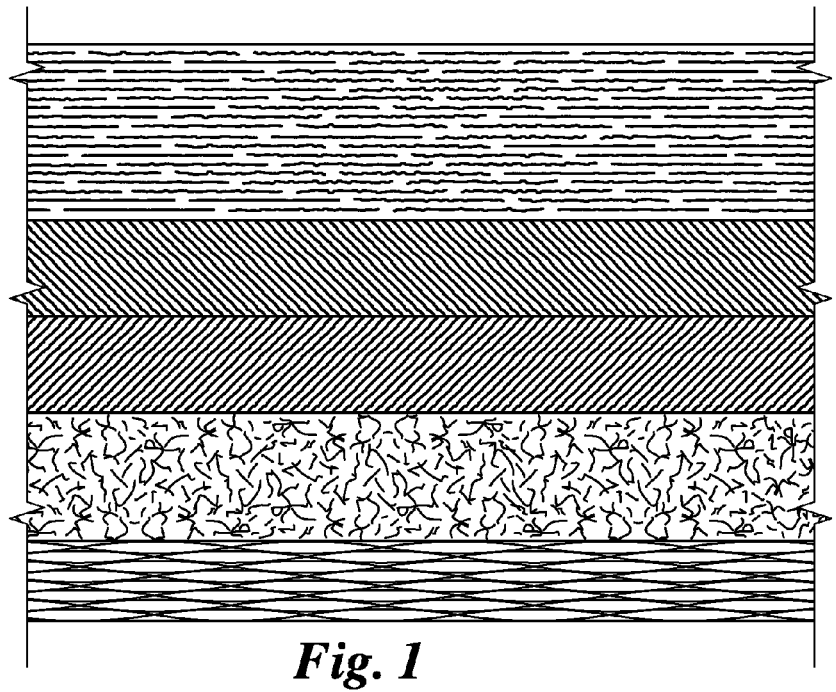
FIG. 1 is an enlarged cross-section view of a composite material made according to this invention. The first, second and third layers combine to make a permeation barrier.
Figure 3A:
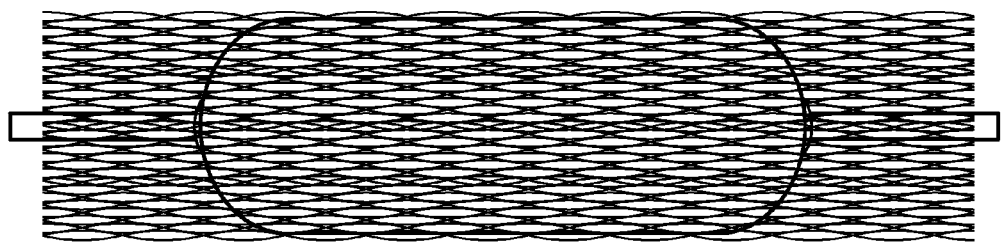
FIG. 3A is a front view of the first layer of the composite material, a woven or braided basalt fiber sleeve, as it is pulled over the disposable ceramic mandrel. The mandrel is preferably a water soluble mandrel.
Figure 3B:
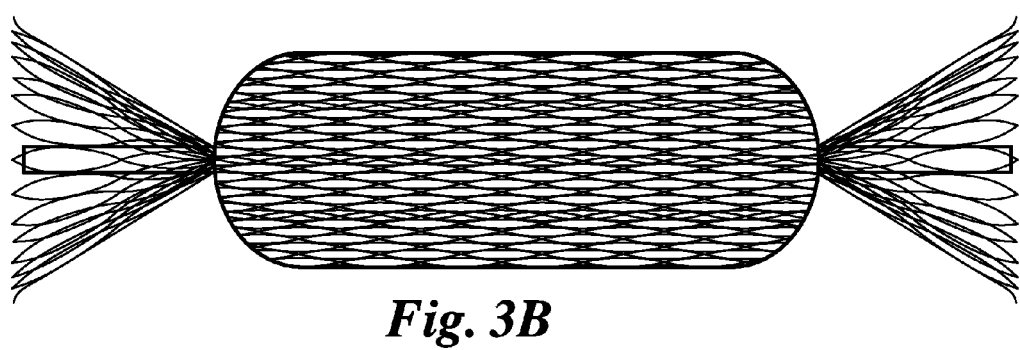
FIG. 3B is a front view of the braided basalt fiber sleeve of FIG. 3A as its ends are twisted over the mandrel.
Figure 2:
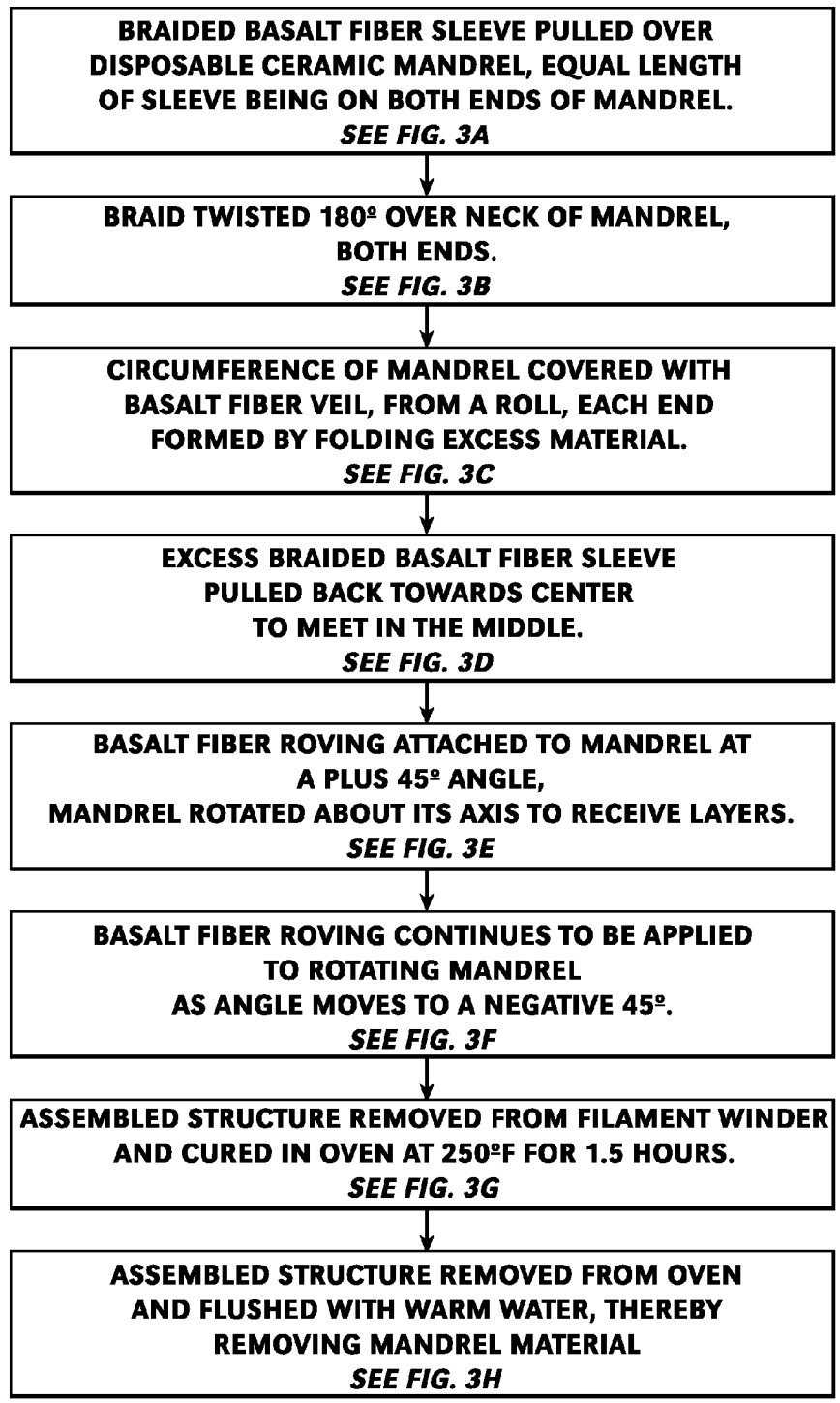
FIG. 2 is a process flow diagram of a method of manufacturing a cylindrical-shaped pressure vessel using the composite material of FIG. 1.
Figure 3C:
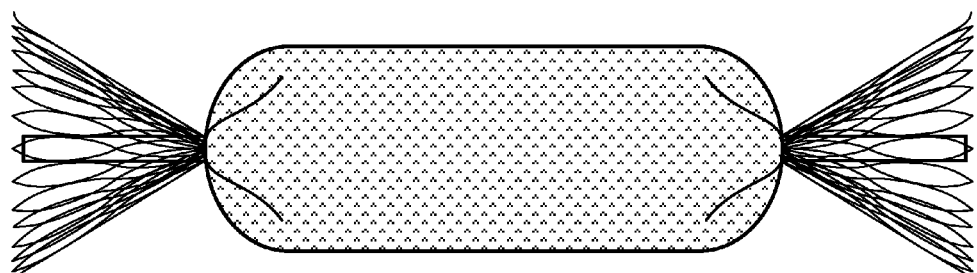
FIG. 3C is a front view of the braided basalt fiber sleeve of FIG. 3B after it is covered with a basalt fiber veil. Randomly oriented chopped basalt fibers impregnated with epoxy resin are assembled in the voids of the braided basalt fiber sleeve.
Figure 3D:
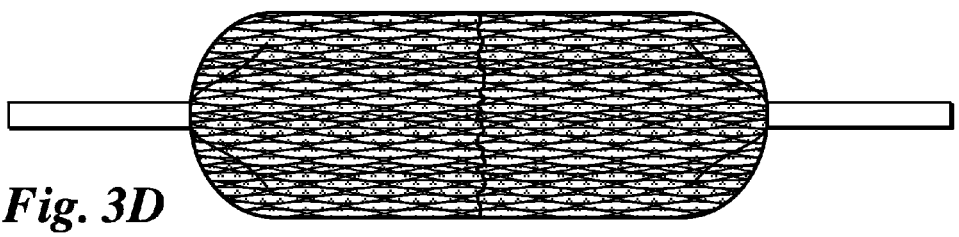
FIG. 3D is a front view of the sleeve of FIG. 3C after the excess braided basalt fiber sleeve is pulled back towards the center to meet in the middle.
Figure 3E:
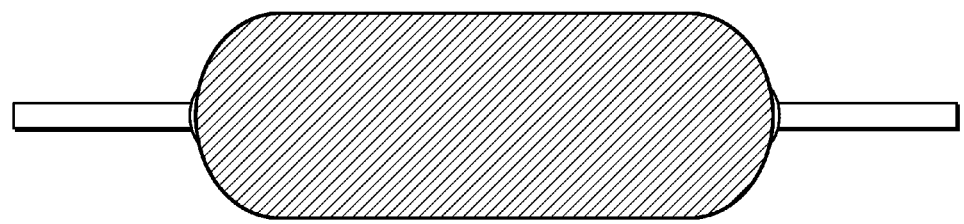
FIG. 3E is a front view of the second layer of the composite material, a basalt fiber roving attached at about a 45° angle. Preferably, the helical angle (or wind) is below 50° and, most preferably, a polar wind (in a range of about 0 to 2°).
Figure 3F:
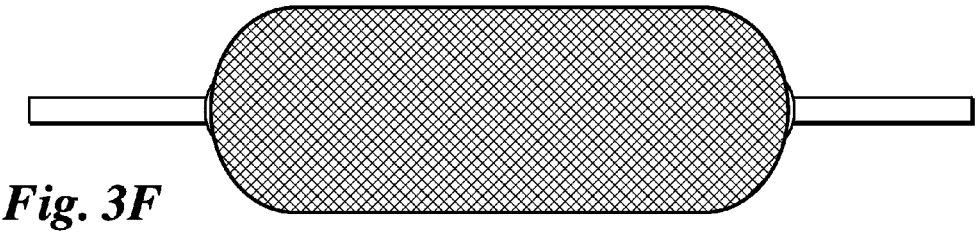
FIG. 3F is a front view of the third layer of the composite material, a basalt fiber roving attached at about a 45° angle. Preferably, the helical angle is different than that of the second layer in FIG. 3E, above 50°, and can be as high as about 80°.
Figure 3G:
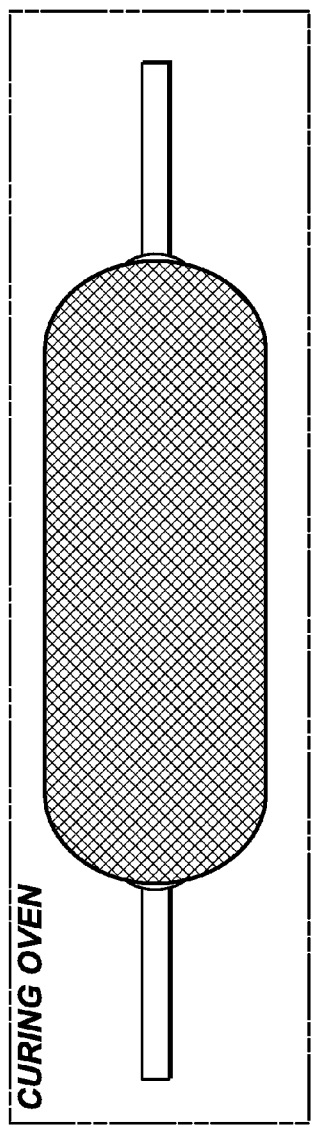
FIG. 3G is a front view composite material after its fourth and fifth layers have been applied. The fourth layer is continuous basalt fibers arranged in a hoop pattern and then cured in an oven. The fifth layer is composed of randomly oriented chopped basalt fibers impregnated with epoxy resin and compacted with the subsequent wound filaments
Figure 3H:
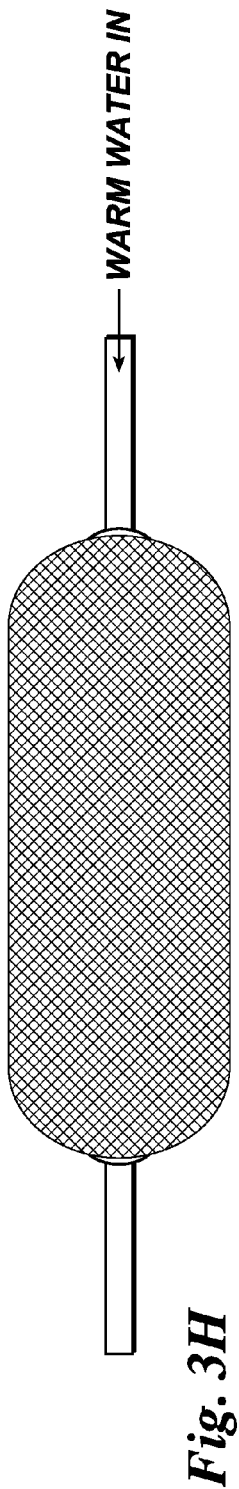
FIG. 3H is a front view of the composite material as the mandrel is flushed with warm water in order dissolve, and therefore, remove it from the assembled pressure vessel.

A basalt reinforced plastic material 10 made according to this invention is especially suited for use in high-pressure storage of gaseous matter such industrial and fuel gasses in compressed natural gas applications and compressed hydrogen fuel applications. A composite material made according to this invention also can be used to store other types of gasses, liquids and powders under pressure (or not under pressure).

Referring first to FIGS. 1 to 3H, the structure of the material 10 and method of making it involves at least five laminate layers 11, 13, 15, 17, 19 and includes impregnated woven, braided, and chopped basalt fibers and a resin matrix. Nano-additives may be added to the resin matrix used in one or more of the layers (see e.g., Seshasai Gandikota, *Selective toughening of carbon/epoxy composites using graphene oxide*. Master's Thesis, Oklahoma State University (December 2011), hereby incorporated by reference).

The first (base or innermost) layer 11 is composed of a resin-impregnated woven basalt fiber sleeve, preferably 13 micron chopped basalt fibers about 12 millimeters in length assembled in the voids of the sleeve and impregnated with an epoxy resin.

The second and third layers 13, 15 are composed of continuous basalt fiber roving arranged in a helical pattern, preferably arranged at about a 2° helical angle, with the third layer 15 being at a 54° helical angle.

The fourth layer 17 is preferably composed of continuous 1200TEX 13 micron basalt fiber roving arranged in a hoop pattern, that is, generally perpendicular to a central longitudinal axis of the mandrel on which the layer is being formed.

The fifth (outermost) layer 19 is preferably composed of randomly oriented chopped 15 micron basalt fibers about 12 millimeters in length impregnated with epoxy resin and compacted.

An aramid fiber, such as DUPONT™ KEVLAR® aramid fiber, may be placed on top of the fifth layer 19 or used as part of the fifth layer 19. Carbon fiber may also be placed on top of the fifth layer 19 or used as part of the fifth layer 19.

Figure 4:
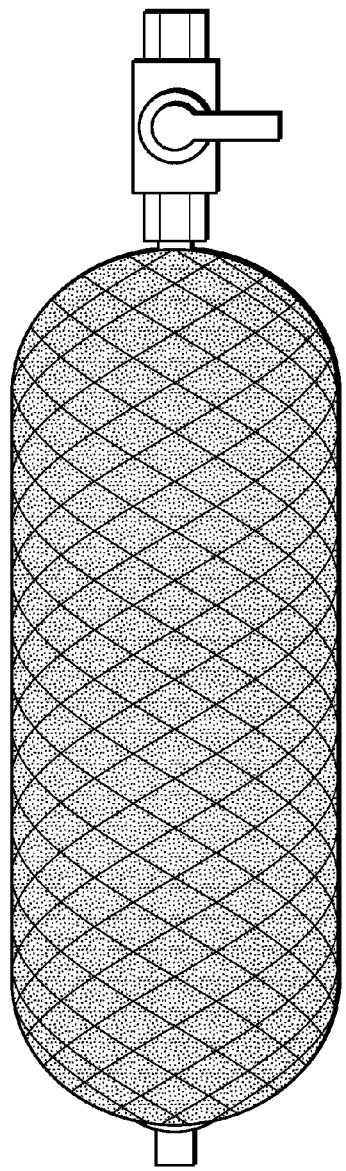
FIG. 4 is a front view of the assembled pressure vessel as it is plumbed for use in storing compressed natural gas in a light-duty motor vehicle application.

Compared to current art materials for use in high-pressure storage of gaseous matter, a basalt fiber-based composite material 10 like that made according to this invention can reduce overall production costs of a pressure vessel like that of FIG. 4, in some cases by about 20%. The basalt-based composite 10 and the resulting pressure vessel 20 are also more economical than lined tanks due to the increased manufacturing costs of metallic and polymer liners. The basalt fiber-based composite 10 also has superior gas barrier properties and mechanical properties compared to metallic- and polymer-lined vessels. Last, it permits the pressure or storage vessel 20 to be liner free, that is, not require the use of a metallic or polymeric liner.

The mandrel 30 is a water-soluble mandrel or tooling (see e.g., R. J. Vaidyanathan et al., *A water soluble tooling material for complex polymer composite components and honeycombs*. SAMPE Conference Proceedings, (Long Beach, Calif., 2003), hereby incorporated by reference). Because the mandrel 30 is water-soluble, a pressure vessel 20 can be any shape desired for a particular application, including non-spherical shaped or non-cylindrical shaped.

Preferred embodiments, and not all possible embodiments, of the pressure vessel have been described so as to enable of person of ordinary skill in the art to make and use the invention, which is defined by the claims listed below.

What is claimed:

1. A pressure vessel comprising an innermost layer having a resin-impregnated woven sleeve and material assembled in voids of the woven sleeve, the pressure vessel not having a liner inward of the woven sleeve.

2. A pressure vessel according to claim 1 wherein the material assembled in the voids of the woven sleeve are chopped basalt fibers.

3. A pressure vessel according to 1 wherein the innermost layer is at least one of carbon-fiber free and aramid-fiber free layer.

4. A pressure vessel according to 1 wherein the pressure vessel is pressure-rated in a range of 100 psi and above.

5. A pressure vessel according to 1 wherein the pressure vessel is formed using a water-soluble tooling.

6. A pressure vessel according to 1 wherein the pressure vessel is non-spherical shaped.

7. A pressure vessel according to 1 wherein the pressure vessel is non-cylindrical shaped.

8. A pressure vessel according to claim 1 wherein the woven sleeve is a basalt fiber woven sleeve.

9. A pressure vessel according to claim 1 wherein the material assembled in the voids of the woven sleeve includes at least one material selected from the group consisting of fibers and a nano-additive.

10. A pressure vessel according to claim 9 further comprising a second layer adjacent to the innermost layer, and a third layer adjacent to the second layer, the second and third layers being arranged at different angles relative to one another.

11. A pressure vessel according to claim 10 further comprising a fourth layer including continuous fibers arranged in a hoop pattern about the third layer.

12. A pressure vessel according to claim 11 further comprising a fifth layer including randomly oriented chopped fibers.

13. A pressure vessel according to claim 12 further comprising a sixth layer, the sixth layer including a fiber material different than that of the fifth layer.

14. A pressure vessel according to claim 10 wherein at least one of the second and third layers is impregnated with a resin matrix.

15. A pressure vessel according to claim 14 wherein the resin matrix is impregnated with a nano-particle additive.

16. A pressure vessel according to claim 10 wherein at least one of the second and third layers is at least one of carbon-fiber free and aramid-fiber free layer.

17. A pressure vessel according to claim 10 wherein the second and third layers include basalt fiber filaments.

* * * * *